United States Patent
Matsumoto et al.

(10) Patent No.: US 6,459,674 B1
(45) Date of Patent: *Oct. 1, 2002

(54) DISC CHANGER APPARATUS WITH VIBRATION FREE TURNTABLE

(75) Inventors: Akira Matsumoto, Yokohama; Hiroto Nishida, Ishikawa-ken; Isamu Nakade, Kaga; Masakazu Kashikawa, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 30 days.

This patent is subject to a terminal disclaimer.

(21) Appl. No.: 09/708,533

(22) Filed: Nov. 9, 2000

Related U.S. Application Data

(62) Division of application No. 09/128,932, filed on Aug. 5, 1998, now Pat. No. 6,212,156.

(30) Foreign Application Priority Data

Jul. 24, 1997 (JP) .............................................. 9-198142

(51) Int. Cl.$^7$ ............................................... G11B 23/03
(52) U.S. Cl. ...................................................... 369/263
(58) Field of Search ............................. 369/263, 30.53, 369/30.6, 30.83, 30.9

(56) References Cited

U.S. PATENT DOCUMENTS

| | | | |
|---|---|---|---|
| 4,561,085 A | * 12/1985 | Funabashi | .................. 369/75.2 |
| 4,841,499 A | 6/1989 | Takahashi et al. | |
| 4,870,518 A | 9/1989 | Thompson et al. | |
| 5,046,059 A | 9/1991 | Yoshida et al. | |
| 5,481,512 A | 1/1996 | Morioka et al. | |
| 5,621,713 A | 4/1997 | Sato et al. | |
| 5,682,364 A | 10/1997 | Ogawa | |
| 5,986,981 A | * 11/1999 | Takemasa et al. | ............ 369/37 |

FOREIGN PATENT DOCUMENTS

| | | |
|---|---|---|
| EP | 0514607 | 11/1992 |
| JP | 2-294967 | 12/1990 |
| JP | 3-235248 | 10/1991 |
| JP | 6-20375 | 1/1994 |

* cited by examiner

Primary Examiner—George J. Letscher
(74) Attorney, Agent, or Firm—Louis Woo

(57) ABSTRACT

A disc changer apparatus includes a casing. A plurality of trays are contained in the casing for carrying discs respectively. The trays are held and arranged in a stack. A region between a designated one of the trays and a tray immediately above the designated tray is expanded. A disc on the designated tray is pushed. A drive mechanism moves a turntable into the expanded region to place the turntable below the pushed disc. The drive mechanism includes a shaft, a base plate supported within the casing via the shaft, a damper, and a chassis connected to the base plate via the damper and carrying the turntable.

2 Claims, 8 Drawing Sheets

DISC CHANGER APPARATUS WITH VIBRATION FREE TURNTABLE

This application is a divisional of U.S. patent application Ser. No. 09/128,932 filed Aug. 5, 1998, now U.S. Pat. No. 6,212,156.

BACKGROUND OF THE INVENTION

1. Field of the Invention

This invention relates to a disc changer apparatus for selecting one of information recording discs (for example, compact discs) and reproducing information from the selected disc.

2. Description of the Related Art

In a typical disc changer apparatus, information recording discs such as compact discs are placed on trays respectively. The trays are arranged in a stack. One of the discs is selected in response to user's request. The selected disc is set on a turntable. Then, the selected disc is rotated while being accessed by an information reading head. Accordingly, the disc changer apparatus is operated in a playback mode, and information is reproduced from the selected disc.

In a disc changer apparatus with an overlap arrangement, a turntable can be moved into and out of regions between trays. The turntable is connected to one end of a swing plate. The other end of the swing plate is connected via a shaft to an elevator plate or a fixed plate. Thus, the swing plate is supported on a cantilever basis. The cantilever support tends to cause the turntable to be vibrated in response to an external force. The vibration of the turntable interferes with reproduction of information from a disc on the turntable.

SUMMARY OF THE INVENTION

It is an object of this invention to provide an improved disc changer apparatus.

A first aspect of this invention provides a disc changer apparatus comprising a casing; a plurality of trays contained in the casing for carrying discs respectively; first means for holding and arranging the trays in a stack; second means for expanding a region between a designated one of the trays and a tray immediately above the designated tray; third means for pushing a disc on the designated tray; a turntable; fourth means for moving the turntable into the region expanded by the second means to place the turntable below the disc which has been pushed by the third means; wherein the fourth means comprises a shaft, a base plate supported within the casing via the shaft, a damper, and a chassis connected to the base plate via the damper and carrying the turntable.

A second aspect of this invention is based on the first aspect thereof, and provides a disc changer apparatus wherein the damper extends between the shaft and the turntable as viewed from above.

A third aspect of this invention provides a disc changer apparatus comprising a plurality of trays for carrying discs respectively; a movable base plate; a damper; a chassis connected to the base plate via the damper; a turntable provided on the chassis; and means for selecting one disc from among the discs on the trays and placing the selected disc on the turntable.

A fourth aspect of this invention is based on the third aspect thereof, and provides a disc changer apparatus further comprising an information pickup head provided on the chassis.

DESCRIPTION OF THE PREFERRED EMBODIMENT

A prior-art disc changer apparatus will be explained below for a better understanding of this invention.

Figure 1:
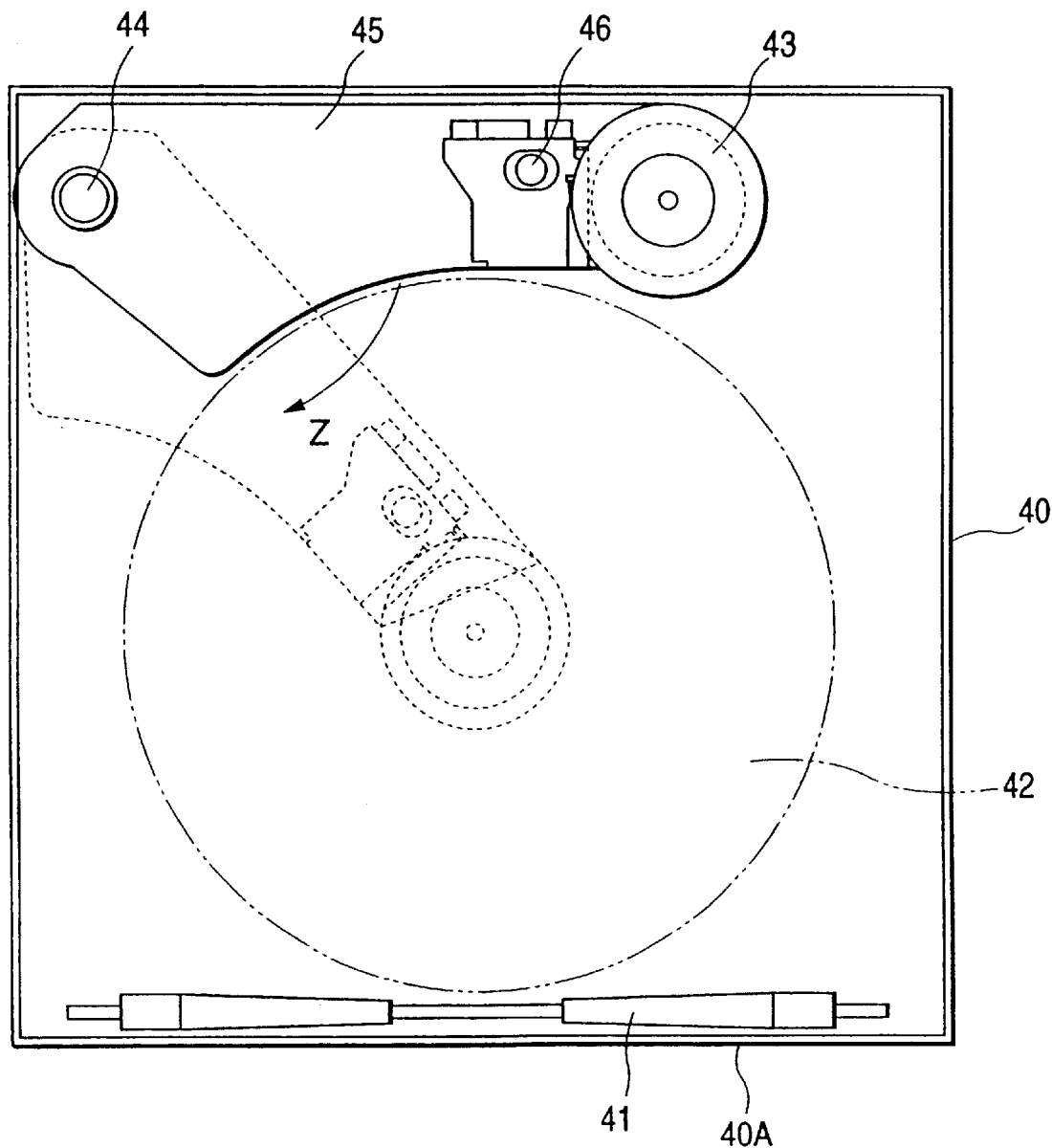
FIG. 1 is a top view of a prior-art disc changer apparatus.

With reference to FIG. 1, the prior-art disc changer apparatus includes a box-shaped casing 40 which has a front panel 40A. The front panel 40A is formed with a disc insertion opening via which a disc 42 can be moved into and out of the casing 40. The casing 40 contains a plurality of trays extending in parallel to each other. The trays are arranged in a stack. Rollers 41 located in the casing 40 are driven by a motor. As a disc 42 is moved into the casing 40 via the disc insertion opening, the disc 42 is fed by the rollers 41 until being placed on one of the trays. Generally, different discs are placed on the trays respective.

The prior-art disc changer apparatus of FIG. 1 has a swing plate 45 whose one end is rotatably supported on a bottom panel of the casing 40 via a shaft 44. The other end of the swing plate 45 rotatably holds a turntable 43. An optical pickup head 46 provided on the swing plate 45 can read out information from a disc on the turntable 43. The optical pickup head 46 movably extends near the turntable 43.

In the prior-art disc changer apparatus of FIG. 1, the swing plate 45 extends outward of the trays when being in its rest position. When one of discs on the trays is designated in response to user's request, the swing plate 45 is rotated about the shaft 44 from its rest position to its operative position. During the rotation of the swing plate 45 as signified by directional arrow Z, the turntable 43 moves to a region below the designated disc. Then, the turntable 43 engages the designated disc, and rotates the designated disc to start reproduction of information therefrom. In this way, one of the discs is selected in response to user's request, and the selected disc is subjected to playback.

In the prior-art disc changer apparatus of FIG. 1, the swing plate 45 is supported on a cantilever basis. The cantilever support tends to cause the turntable 43 and the optical pickup head 46 to be vibrated in response to an external force. The vibrations of the turntable 43 and the optical pickup head 46 interfere with the reproduction of information from the selected disc.

Embodiment of the Invention

With reference to FIGS. 2–6, a disc changer apparatus of an embodiment of this invention includes a box-shaped casing 1 which has a front panel 1A. A central portion of the front panel 1A is formed with a disc insertion opening via which a disc 3 can be moved into and out of the casing 1. Disc loading rollers 2 located in the casing 1 near the disc insertion opening are rotated by a roller drive mechanism (not shown). The rollers 2 operate to feed a disc 3. The rollers 2 enable a disc 3 to be inserted into and ejected from the casing 1 via the disc insertion opening.

A plurality of trays 4 are located in a corner region of the interior of the casing 1 which are defined between a back panel 1B and a right-hand side panel 1C of the casing 1. The trays 4 have a semicircular or semicircumferential shape. The trays 4 are stacked along the vertical direction of the casing 1. Generally, discs 3 are placed on and received by the trays 4 respectively.

An upper metal plate 5A extends above the uppermost tray 4. A lower metal plate 5B extends below the lowermost tray 4. Each of the metal plates 5A and 5B and the tray 4 has three holes. Three tray guide shafts fixed between an upper panel and a lower panel of the casing 1 extend through the holes of the metal plates 5A and 5B and the tray 4. The metal plates 5A and 5B and the tray 4 can move vertically while being guided by the tray guide shafts.

The casing 1 contains a lever 6 which is supported via a pin 6A. The pin 6A engages one end of the lever 6. The lever 6 can rotate about the pin 6A. The other end of the lever 6 rotatably holds a roller 7. The lever 6 is urged by a spring (not shown) in the clockwise direction as viewed in FIG. 2.

During the insertion of a disc 3 into the casing 1 via the disc insertion opening, the disc 3 is fed by the rollers 2 toward the back panel 1B of the casing 1, and the circumference of the disc 3 meets the roller 7. The roller 7 changes the direction of the feed of the disc 3 toward the trays 4. Then, the disc 3 reaches one of the trays 4, being placed thereon and received thereby.

Figure 4:
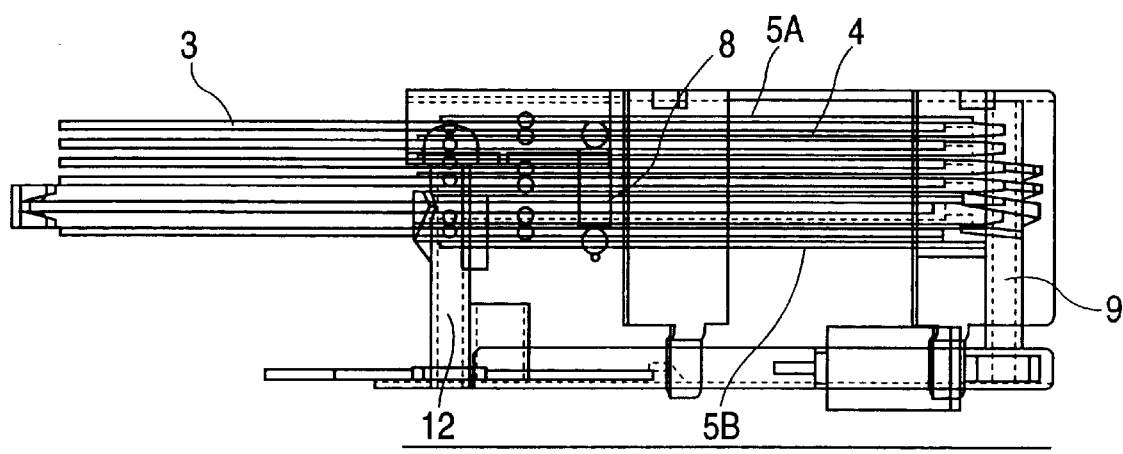
FIG. 4 is a side view of a tray drive mechanism in the disc changer apparatus of FIG. 2.
Figure 5:
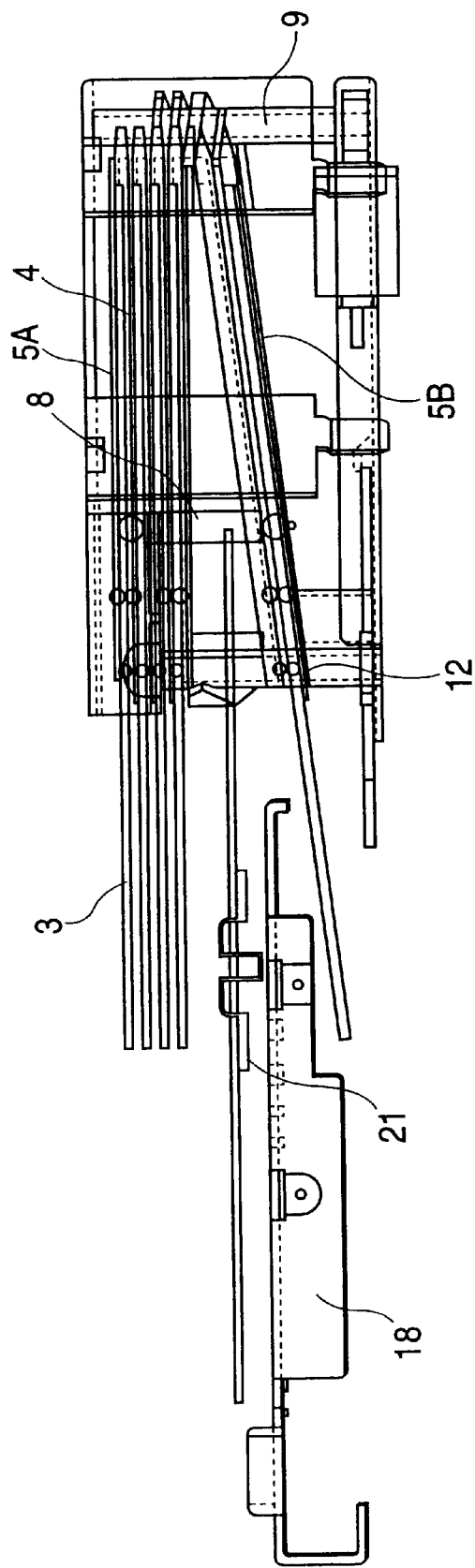
FIG. 5 is a side view of the tray drive mechanism of FIG. 4 which is in a playback operation state.
Figure 6:
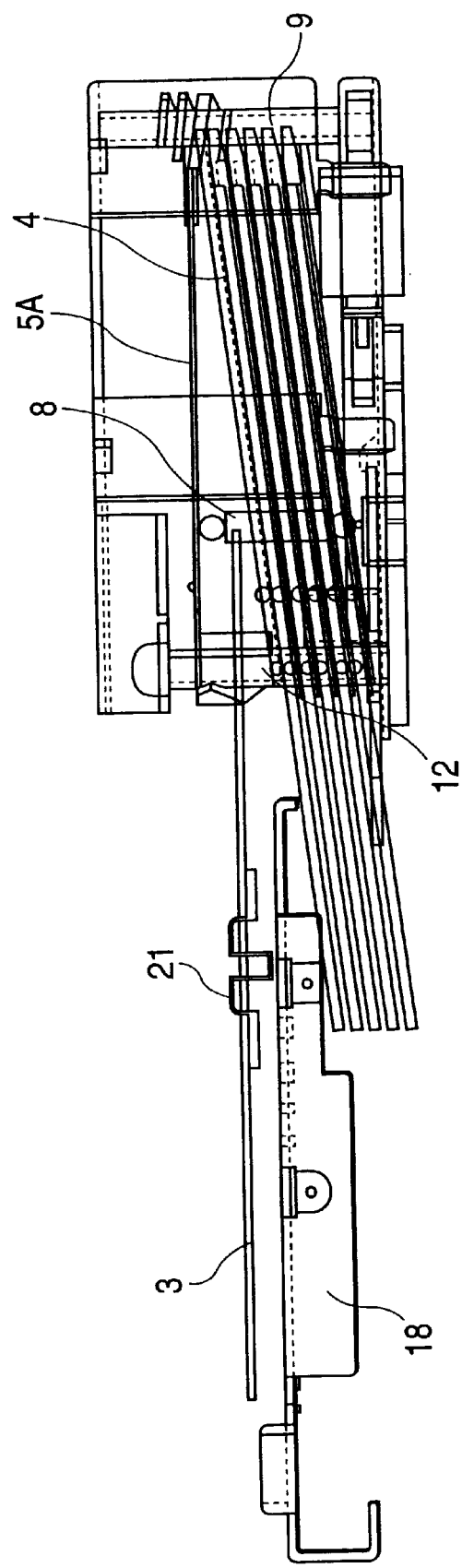
FIG. 6 is a side view of the tray drive mechanism of FIG. 4 which is in a playback operation state.

With reference to FIGS. 4–6, a helical spring 8 extends vertically within the casing 1. An upper end of the helical spring 8 is connected to the upper metal plate 5A. A lower end of the helical spring 8 is connected to the lower metal plate 5B. The helical spring 8 urges the metal plates 5A and 5B toward each other, forcing and holding the trays 4 between the metal plates 5A and 5B as best shown in FIG. 4.

Figure 7:
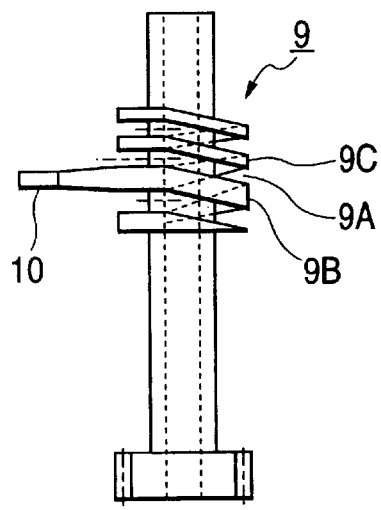
FIG. 7 is a side view of a cam gear in the tray drive mechanism of FIG. 4.

A cam gear 9 is rotatably supported within the casing 1. As best shown in FIG. 7, the cam gear 9 has a spiral cam groove 9A into which projections of the trays 4 and the metal plates 5A and 5B fit. The cam gear 9 has a spiral ridge extending along the spiral cam groove 9A. A given portion 9B of the spiral ridge on the cam gear 9 has a width greater than the width of other portions 9C of the spiral ridge. The cam gear 9 has a projection 10 horizontally extending from the greater-width portion 9B of the spiral ridge. The projection 10 is integral with the greater-width portion 9B of the spiral ridge.

Cam gears 11 and 12 are rotatably supported within the casing 1. The cam gears 11 and 12 are similar in structure to the cam gear 9. Specifically, each of the cam gears 11 and 12 has a spiral cam groove into which projections of the trays 4 and the metal plates 5A and 5B fit. Each of the cam gears 11 and 12 has a spiral ridge extending along the spiral cam groove. A given portion of the spiral ridge on each of the cam gears 11 and 12 has a width greater than the width of other portions of the spiral ridge.

The cam gears 9, 11, and 12 are connected to a motor (not shown) via a power transmission arrangement. The cam gears 9, 11, and 12 are synchronously rotated by the motor.

Cam gears 13 and 14 are rotatably supported within the casing 1 near the cam gears 11 and 12 respectively. Each of the cam gears 13 and 14 has a spiral cam groove into which projections of the trays 4 and the metal plates 5A and 5B fit. Each of the cam gears 13 and 14 has a spiral ridge extending along the spiral cam groove. Given portions of the ridges on the cam gears 13 and 14 have widths greater than the widths of the ridges on the cam gears 11 and 12. The cam gears 13 and 14 are connected to a motor (not shown) via a power transmission arrangement. The cam gears 13 and 14 are synchronously rotated by the motor.

When the cam gears 9, 11, and 12 are rotated, the related projections of the trays 4 and the metal plates 5A and 5B relatively slide along the spiral cam grooves therein and thus relatively move along the spiral ridges thereon. During the rotation of the cam gears 9, 11, and 12, the trays 4 and the metal plates 5A and 5B are moved vertically while the regions among the trays 4 and the metal plates 5A and 5B are sequentially expanded and contracted. The greater-width portions of the spiral ridges on the cam gears 9, 11, and 12 cause the expansions of the regions among the trays 4 and the metal plates 5A and 5B.

When the cam gears 13 and 14 are rotated, the related projections of the trays 4 and the metal plates 5A and 5B relatively slide along the spiral cam grooves therein and thus relatively move along the spiral ridges thereon. During the rotation of the cam gears 13 and 14, the trays 4 and the metal plates 5A and 5B are moved vertically while the regions among the trays 4 and the metal plates 5A and 5B are sequentially expanded and contracted. The greater-width portions of the spiral ridges on the cam gears 13 and 14 cause the expansions of the regions among the trays 4 and the metal plates 5A and 5B. The degree of the region expansions provided by the cam gears 13 and 14 is greater than the degree of the region expansions provided by the cam gears 9, 11, and 12.

FIG. 5 shows an example of conditions of the trays 4 and discs thereon which occur when the disc changer apparatus is in a playback operation state. In this case, as shown in FIG. 5, one of the regions among the trays 4 and the metal plates 5A and 5B is greatly expanded by the cam gears 13 and 14.

Figure 8:
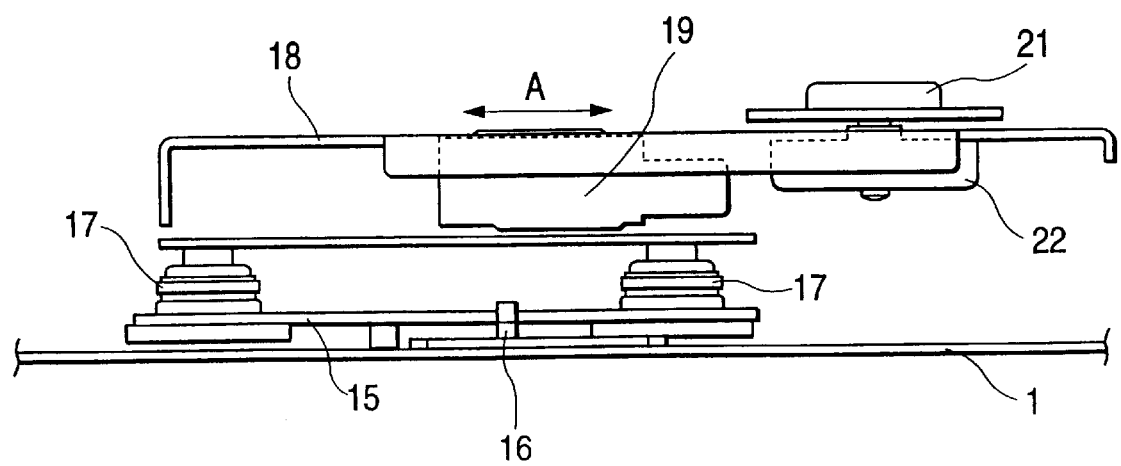
FIG. 8 is a side view of an optical head chassis and associated members in the disc changer apparatus of FIG. 2.

As best shown in FIG. 8, a base plate or a substrate 15 is rotatably supported on the upper surface of the lower panel of the casing 1 via a shaft 16. The base plate 15 is rotated about the shaft 16 by a drive mechanism (not shown). A chassis 18 is supported on the base plate 15 via three dampers 17 made of rubber. An optical pickup head 19 is movably connected to the chassis 18. A feed screw can move the optical pickup head 19 relative to the chassis 18 in opposite directions "A". The optical pickup head 19 has an optical system including a light emitting element (a laser element), a photosensitive element, and an objective lens 20.

When the disc changer apparatus is in its playback operation state, the light emitting element outputs laser light. The laser light outputted from the light emitting element passes through the objective lens 20 before being applied to a disc 3 on a turntable 21 which will be explained later. The laser light is reflected by the disc 3, forming return light which carries information recorded on the disc 3. The return light passes through the objective lens 20, and then reaches the photosensitive element. The photosensitive element converts the return light into an electric signal containing the information recorded on the disc 3. The photosensitive element outputs the electric signal to a signal processing circuit (not shown) for reproducing the information recorded on the disc 3.

Figure 9:
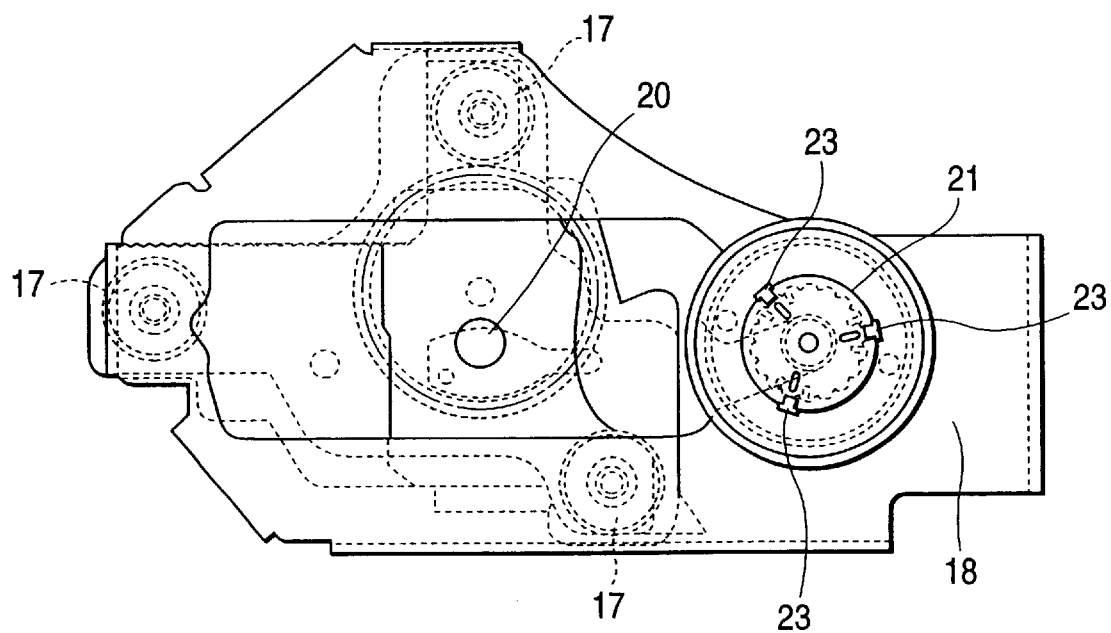
FIG. 9 is a top view of the optical head chassis and the associated members in FIG. 8.

As best shown in FIGS. 8 and 9, a turntable 21 is rotatably supported on the chassis 18. The turntable 21 is directly coupled to the rotational shaft of a motor 22 which has a body attached to the lower surface of the chassis 18. The turntable 21 is rotated by the motor 22. The turntable 21 has claws 23 which are moved between closed positions and open positions by a claw drive mechanism. When a disc 3 is absent from the turntable 21, the claws 23 are in their closed positions. When a disc 3 is placed on the turntable 21, the claw drive mechanism outwardly forces the claws 23 into their open positions at which the claws 23 firmly holds the disc 23 on the turntable 21. Thus, the claws 23 operate to fix the disc 23 to the turntable 21. The disc 3 on the turntable 21 is accessed by the optical pickup head 19. The directions "A" of the movement of the optical pickup head 19 relative to the chassis 18 agree with radial directions of the disc 3 on the turntable 21.

Figure 2:
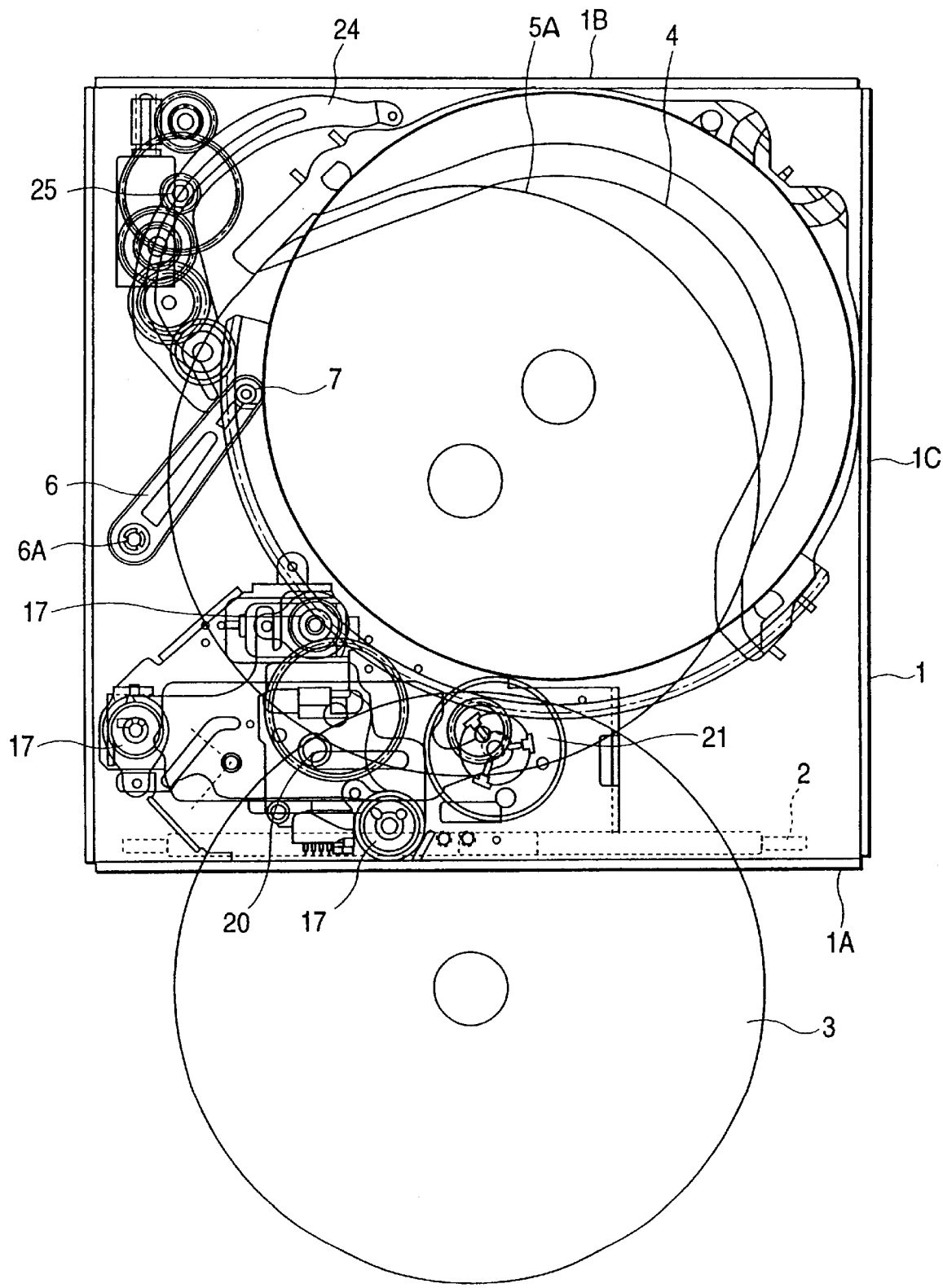
FIG. 2 is a top view of a disc changer apparatus according to an embodiment of this invention.
Figure 3:
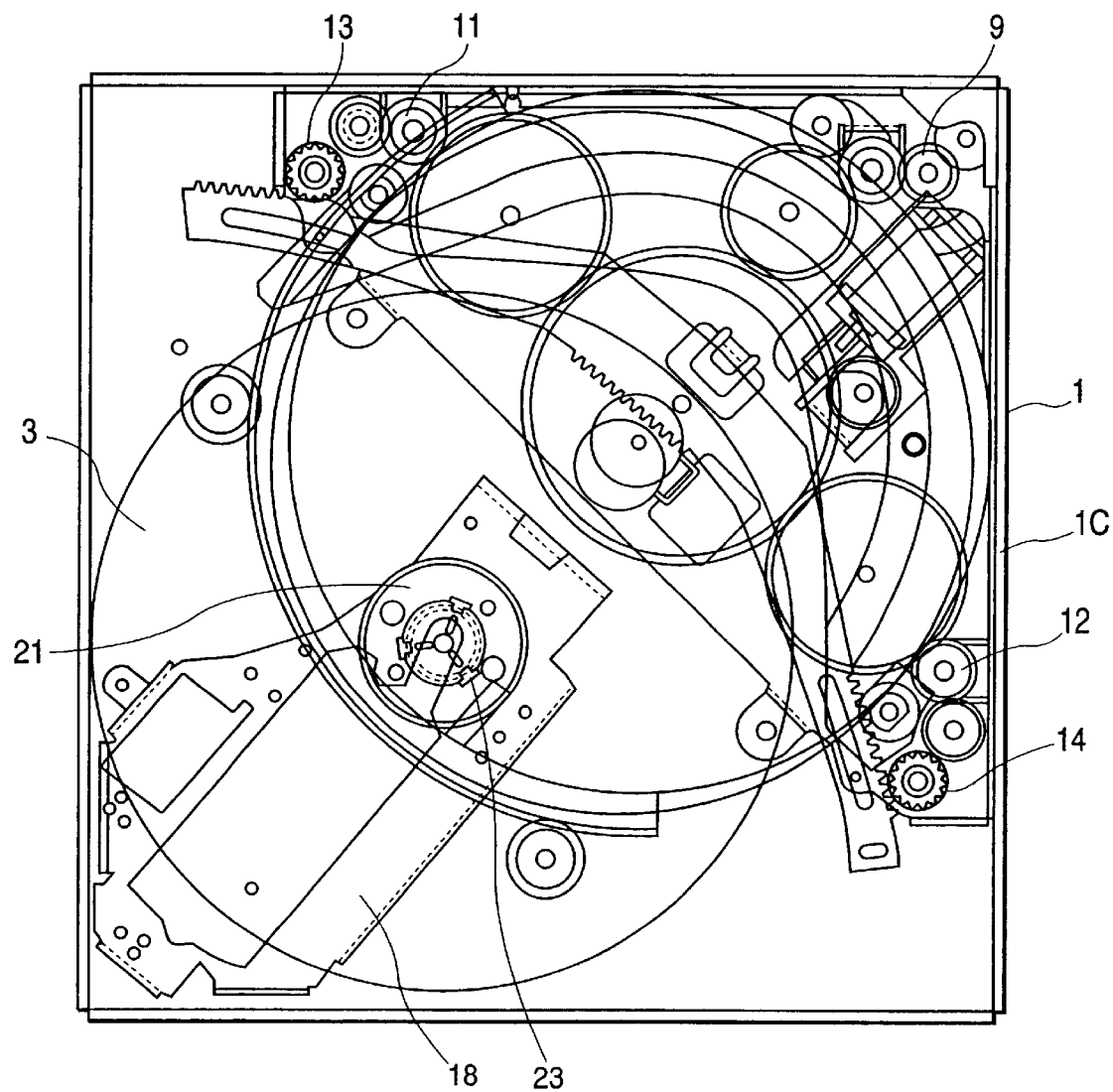
FIG. 3 is a top view of the disc changer apparatus in FIG. 2 which is in a playback operation state.

As best shown in FIG. 2, the casing 1 contains a disc pushing lever 24 slidably held by an end of a shaft 25. A drive mechanism (not shown) moves the disc pushing lever 24 clockwise and counterclockwise as viewed in FIG. 2. As the disc pushing lever 24 is moved clockwise from its rest position, an end of the disc pushing lever 24 enters the stack of the trays 4 and meets the circumferential surface of a disc 3 on one of the trays 4. Then, the disc pushing lever 24 forces the disc 3 toward the center of the interior of the casing 1. The disc 3 is placed on the turntable 21. Subsequently, the disc 3 is fixed to the turntable 21, and is rotated thereby.

The disc changer apparatus of FIGS. 2–9 operates as follows. When one of discs 3 on the trays 4 is designated, the cam gears 9, 11, and 12 are rotated so that the tray 4 which carries the designated disc 3 is vertically moved to a given position where the disc push lever 24 can meet the designated disc 3. After the tray 4 in question reaches the given position, the disc push lever 24 is moved clockwise as viewed in FIG. 2. Then, the disc pushing lever 24 meets the designated disc 3 and forces the designated disc 3 to a predetermined position. When the designated disc 3 reaches the predetermined position, a hold mechanism (not shown) retains the designated disc 3. Subsequently, the cam gears 13 and 14 are rotated so that the two ends of the tray 4 which carries the designated disc 3 are displaced downward. On the other hand, the hold mechanism continues to retain the designated disc 4. Thus, the two ends of the tray 4 separate from the designated disc 3 by a large distance. Then, the base plate 15 is rotated about the shaft 16. The chassis 18, the optical pickup head 19, and the turntable 21 move together with the base plate 15. The turntable 21 enters the region between the designated disc 3 and the related tray 4. The turntable 21 is moved to a preset position directly below the designated disc 3. Then, the designated disc 3 is placed on the turntable 21 while being released from the hold mechanism. Subsequently, the claws 23 on the turntable 21 are outwardly forced to their open positions so that the claws 23 fix the designated disc 3 to the turntable 21. After the designated disc 3 is fixed to the turntable 21, the turntable 21 is rotated by the motor 22. The designated disc 3 rotates together with the turntable 21. During the rotation of the designated disc 3, the optical pickup head 19 reads out information therefrom.

In the disc changer apparatus of FIGS. 2–9, the optical pickup head 19 and the turntable 21 are provided on the chassis 18. The chassis 18 is supported on the base plate 15 via the dampers 17. The dampers 17 suppress vibrations of the optical pickup head 19 and the turntable 21. The base plate 15 is supported on the lower panel of the casing 1 via the shaft 16. The base plate 15 can rotate about the shaft 16. At least one of the dampers 17 extends between the shaft 16 and the turntable 21 as viewed from above. Thus, the cantilever support for the turntable 21 has a relatively short arm which is effective in preventing vibrations of the turntable 21.

What is claimed is:

1. A disc changer apparatus comprising:

a casing;

a plurality of trays contained in the casing for carrying discs respectively;

first means for holding and arranging the trays in a stack;

second means for expanding a region between a designated one of the trays and a tray immediately above the designated tray;

third means for pushing a disc on the designated tray when the region between the designated tray and the tray immediately above the designated tray has been expanded by the second means;

a turntable; and fourth means for moving the turntable to place the turntable below the disc which has been pushed by the third means;

wherein the fourth means comprises a shaft, a base plate supported within the casing via the shaft, a damper, and a chassis connected to the base plate via the damper and carrying the turntable, wherein the shaft is located between the turntable and the damper as viewed from a side of the apparatus.

2. A disc changer apparatus comprising:

a casing;

a plurality of trays contained in the casing for carrying discs respectively;

first means for holding and arranging the trays in a stack;

second means for expanding a region between a designated one of the trays and a tray immediately above the designated tray;

third means for pushing a disc on the designated tray when the region between the designated tray and the tray immediately above the designated tray has been expanded by the second means;

a turntable; and fourth means for moving the turntable to place the turntable below the disc which has been pushed by the third means;

wherein the fourth means comprises a shaft, a base plate supported within the casing via the shaft, at least first and second dampers, and a chassis connected to the base plate via the first and second dampers and carrying the turntable, wherein the turntable, the first damper, the shaft, and the second damper are located sequentially in that order as viewed from a side of the apparatus.

* * * * *